United States Patent [19]
Easter

[11] Patent Number: 5,856,615
[45] Date of Patent: Jan. 5, 1999

[54] RELIEF VALVE TESTING MECHANISM

[76] Inventor: Basil O. Easter, P.O. Box 328, Milan, Ill. 61264

[21] Appl. No.: 799,504

[22] Filed: Feb. 12, 1997

[51] Int. Cl.$^6$ ................................................ G01L 27/00
[52] U.S. Cl. ............................................. 73/1.72; 73/1.63
[58] Field of Search ................................. 73/1.72, 1.71, 73/1.63, 1.64, 1.66

[56] References Cited

U.S. PATENT DOCUMENTS

| | | | |
|---|---|---|---|
| 3,269,170 | 8/1966 | Sebring et al. | 73/1.72 |
| 3,485,082 | 12/1969 | Myers | 73/1.72 |
| 3,768,299 | 10/1973 | Garren | 73/1.72 |
| 4,766,765 | 8/1988 | Ezekoye | 73/1.72 |
| 4,852,387 | 8/1989 | Bingham | 73/1.72 |

Primary Examiner—Michael Brock
Assistant Examiner—Nashmiya Fayyaz

[57] ABSTRACT

A testing mechanism for testing the pressure at which a relief valve will open due to excessive pressure in a fluid system having fluid carrying conduits, the mechanism includes a stop member having a first position whereat the stop member exposes the relief valve to the fluid system and a second position whereat the stop member seals or isolates the relief valve from the fluid system during a test of the relief valve. A pressure gauge is positioned between the stop member and the relief valve for sensing the pressure of fluid engaging the relief valve when the stop member is in the second position. A pressure applying mechanism applies pressure to the relief valve when the stop member is in the second position. A barrier positioned between the pressure applying mechanism and the relief valve prevents fluids other than fluid within the fluid system from engaging the relief valve when the pressure applying mechanism is actuated. The stop member is coupled with the barrier for automatically isolating the relief valve from the fluid system when the pressure applying mechanism is actuated.

8 Claims, 2 Drawing Sheets

RELIEF VALVE TESTING MECHANISM

BACKGROUND OF THE INVENTION

1) Field of the Invention

This invention relates to mechanisms for testing the pressure at which safety relief valves are actuated.

2) Related Art

It is known to provide relief valves on mechanisms which have pressurized conduits or pressurized vessels. For example, relief valves are typically provided in such pressurized mechanisms as sterilizers which use pressurized steam to clean bacteria and other debris from medical instruments. If the pressure of the fluids within the conduits or pressurized vessels of the sterilizer increases significantly, the conduits or vessel may rupture, burst or otherwise fail. Therefore, relief valves are typically provided for allowing pressurized fluids within the conduits to be discharged from the system through the relief valve so that the fluid pressure in the system drops. As the fluid pressure drops, the conduits and vessel are prevented from bursting or otherwise failing. Typical relief valves are conventional check valves having a ball held by a spring against an orifice. As the pressure in the conduit increases it presses against the ball until the force of the fluid pressure overcomes the spring force and presses the ball away from the orifice. The pressurized fluid then passes through the unobstructed orifice and is thereby discharged from the conduit. The relief valve prevents the system from being over-pressurized, and thereby helps prevent the components of the pressurized mechanism from bursting or otherwise failing during operation.

It is desirable for an operator of such a pressurized mechanism to know that the relief valve is working properly and that the relief valve will discharge pressurized fluid at a pressure beneath that which would damage the conduits or tanks. It is therefore advantageous to know at what pressure the relief valve will blow. If that pressure is less than but close to the pressure that will cause the tank or conduits to fail, then the relief valve is still in good working condition. If that pressure is significantly less than or higher than the pressure that will cause the tank or conduits to fail, then the relief valve is not in satisfactory condition and must be replaced or reconditioned.

Several methods have been devised for determining at what pressure the relief valve will be actuated. Some such methods involve taking readings of the force in the spring of the relief valve and then using this reading to calculate the pressure at which the relief valve will blow. These test mechanisms have the advantage of not requiring the removal of the relief valve from the mechanism. However, the calculations can be somewhat inaccurate, in part because they are based on presumptions, such as, that the ball will not stick to the orifice. If the ball of the relief valve is not in perfect operating condition and will stick, then the presumption is not correct, and the calculation will be inaccurate.

Other test methods involve removing the relief valve from the mechanism for bench testing. The relief valve is then mounted to a tester mechanism to determine the pressure at which the relief valve will blow. These bench test mechanisms have the advantage of allowing the operator to actuate the relief valve during the test so that inaccurate calculations and presumptions are not utilized and do not create inaccurate test results. Also, bench testing mechanisms often allow the relief valve to be tested using the fluid that is present in the pressurized conduits during operation of the mechanism, which can lend itself to relatively accurate test results. However, bench testing requires that the operator remove the safety valve from the pressurized mechanism, which can be time consuming, messy, complicated, and can result in downtime for the machine.

Yet another method of testing the pressure at which the safety valve will be actuated involves increasing the pressure inside the system until the safety valve blows. An operator will slowly increase the pressure in the system while observing a pressure gauge to insure that the pressure remain below critical levels that might cause the conduits or tanks to fail. When the safety valve is actuated the operator will note the pressure of the system on the pressure gauge. The operator is thereby accurately informed of the pressure at which the safety valve will be actuated. The test is in situ such that the results will be quite accurate. No inaccurate calculations or presumptions are utilized to determine this pressure value. The safety valve is tested using the same fluid that is in the system during normal operation of the mechanism, thereby rendering relatively accurate test results. However, this type of test requires that the mechanism itself increase the fluid pressure applied to the relief valve, which places the system itself at risk of failure due to the increased pressure. Furthermore, increasing the pressure of the entire mechanism can be a lengthy process, as can be the resetting of the mechanism to its proper operating levels after the test.

Therefore, it would be desirable to provide a mechanism for testing relief valves of pressurized systems that allows such relief valves to be tested in place without requiring removal of the relief valve from the pressurized system. It would also be desirable for such a mechanism to test the relief valve while engaging the relief valve with fluid that is actually present in the pressurized system such that the test conditions replicate actual operating conditions. This would render more accurate test results. It would be desirable for such a mechanism to eliminate the need for calculations or interpolations, and that does not depend on presumptions such as that the ball will not stick in the relief valve. It would also be desirable for such a mechanism to reduce or eliminate the risks of failure of the fluid system components during such a pressure test.

BRIEF SUMMARY OF THE INVENTION

A test mechanism is provided for testing the pressure at which a relief valve is actuated by excessive pressure in a fluid system. The test mechanism includes a pivoting stop member having a first position whereat the stop member exposes the relief valve to the fluid system during normal operation of the system, and a second position whereat the stop member seals or isolates the relief valve from the fluid system during pressure tests of the relief valve. A pressure gauge is operatively positioned between the stop member and the relief valve for sensing the pressure being applied to the relief valve during a pressure test. A pressure applying mechanism such as an air hose from a pressurized air source applies pressure to the relief valve when the stop member is in its second position. A barrier positioned between the pressure applying mechanism and the relief valve prevents fluids other than fluid within the fluid system from engaging the relief valve when the pressure applying mechanism is actuated. In one embodiment of the present invention the barrier is a bellows, and in another embodiment the barrier is a piston. The stop member is coupled with the barrier via an arm and a lost motion connection for automatically sealing or isolating the relief valve from the fluid system when the pressure applying mechanism is actuated. According to the preferred embodiment of the present invention, the tester mechanism includes a cross tee conduit having four legs, wherein the fluid system and relief valve are coupled with respective opposite first and second legs, and the pressure applying mechanism and pressure gauge are operatively coupled with respective opposite third and forth legs. The pressure applying mechanism may be a mechanism such as an air hose as stated above or a lever mechanism operatively engaged against the barrier for shifting the barrier and thereby applying pressure to the relief valve.

The present invention allows an operator to test a relief valve in place without requiring the relief valve be removed from its pressurized system. The barrier of the present invention separates the fluid in the system from the air from the air hose that applies the pressure during the test. Therefore, during the test procedure, the present invention applies pressure to the relief valve with the same fluid that engage the relief valve during normal operation of the system. The results of the test are therefore accurate since the conditions encountered by the relief valve during the test replicate the conditions encountered during normal operation of the system. The present invention actually blows the relief valve during the pressure test, and therefore no calculations or interpolations are utilized that may be based on inaccurate presumptions. The stop member of the present invention isolates the relief valve from the system during the pressure tests, and thereby eliminates the need for the operator to reset the system pressure after a test. The stop member also prevents the system from experiencing the high pressures that are applied to the relief valve during the test, thereby reducing or eliminating the risks of failure of the fluid system components during such a pressure test. Since the system is isolated from the high pressure applied to the relief valve, the system pressure does not have to be reset after the pressure test.

DETAILED DESCRIPTION OF THE INVENTION

Figure 1:
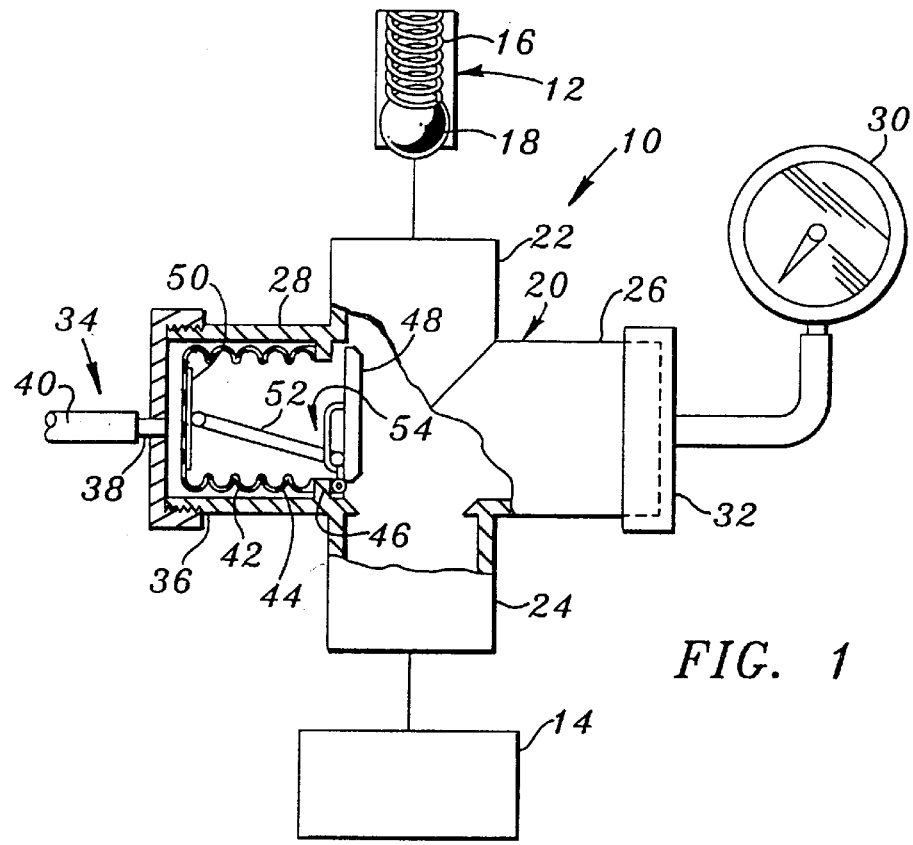
FIG. 1 is a schematic view of the relief valve tester according to the present invention during normal operation of the pressurized system.

Referring now to FIGS. 1–4, there is shown the relief valve testing mechanism 10 according to the preferred embodiment of the present invention. A conventional ball valve pressure relief valve 12 is operatively coupled with a system 14 shown schematically in FIG. 1 and having conduits and/or a tank which hold fluid under pressure. For example, the mechanism 14 may be a sterilizer which cleanses surgical instruments with pressurized steam. The relief valve 12 is operatively coupled with the system 14 so that when pressure in the system 14 reaches undesirably high levels the relief valve 12 will open to allow fluid to be discharged from the system 14 via the relief valve 12. The relief valve 12 includes a spring 16 which presses against a ball 18 with a force having a magnitude specifically selected to allow the relief valve 12 to open when undesirably high pressures within the system 14 are achieved. When the valve 12 opens and fluid is discharged through the relief valve 12, the pressure in the system 14 drops to appropriate levels. This prevents the pressure in the system 14 from building up to such an extent that the system components, tanks or conduits will be damaged, fail or burst under the increased pressure.

Figure 2:
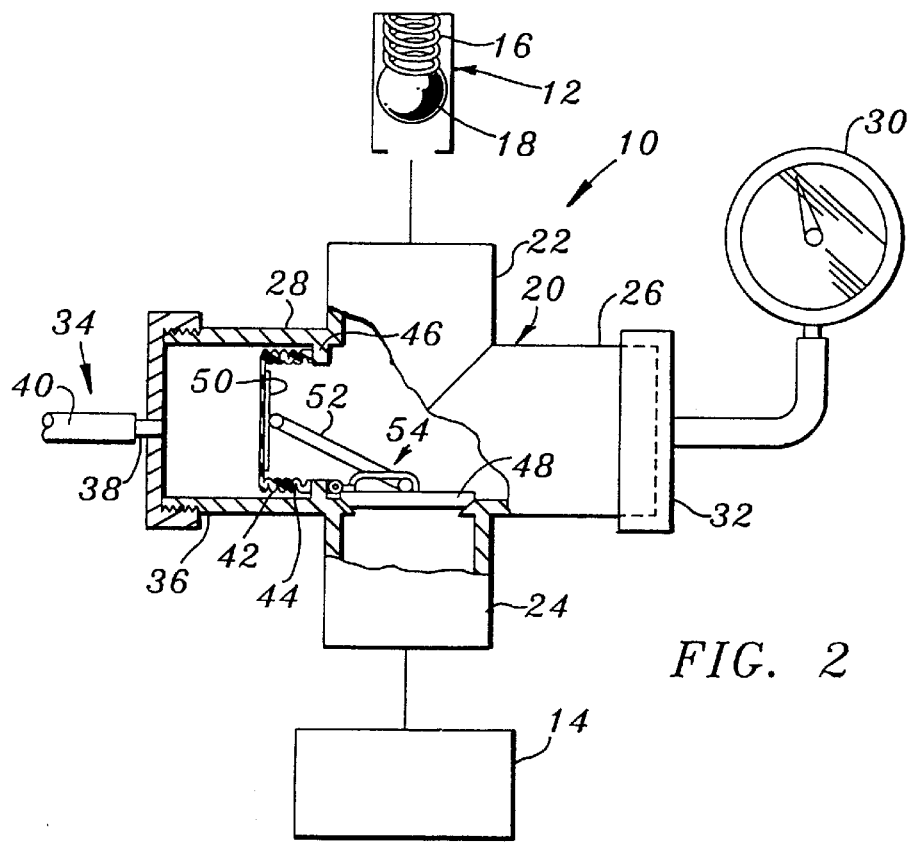
FIG. 2 is a schematic view of the relief valve tester during a test procedure.

The test mechanism 10 according to the present invention allows an operator to determine whether the relief valve 12 is operating properly so that it will open at the appropriate system fluid pressure. The tester 10 includes a cross tee conduit member 20 having first, second, third and fourth leg portions 22, 24, 26 and 28 having circular cross sections. First and second opposite legs 22 and 24 of the tee member 20 are operatively coupled to the relief valve 12 and the system 14, respectively. The tester 10 includes a pressure gauge 30 operatively mounted with an end cap 32 positioned over the end of the third leg 26 of the cross tee member 20. A pressure applying mechanism 34 is operatively coupled with the end portion 36 of the fourth leg 28 of the cross tee member 20. The pressure applying mechanism 34 shown in FIGS. 1 and 2 is an air hose connection 38 and air hose 40. A barrier member 42 or bellows 44 is positioned within the fourth leg 30 and is operatively mounted with a ring 46 secured within the fourth leg 28. A stop member or disk 48 is pivotally positioned within the fourth leg 28 and is coupled with a wall 50 of the bellows 44 by way of an arm member 52, as will be described in greater detail below.

Next, the operation of the present invention will be discussed. During normal operation of the system 14, the stop member 48 is in a first, non-sealing position as shown in FIG. 1 such that the relief valve 12 is in fluid communication with the system 14 via the unobstructed first and second leg portions 22 and 24 of the tee member 20. If pressure in the system 14 increases excessively, fluid pressure in the cross tee member 20 will correspondingly increase. The fluid in the tee member 20 will apply pressure to the ball 18, and the relief valve 12 will eventually open and allow pressurized fluid to exit the system 14, thereby lowering the pressure in the system 14.

When an operator wishes to test the pressure at which the relief valve 12 opens, the tester mechanism 10 according to the present invention is actuated. The operator will attach an air hose 40 to the hose connection 38 and begin applying pressurized air to the tester mechanism 10 through the hose connection 38. The pressurized air will pass through the hose connection 38 and contact the wall 50 of the bellows 44, causing the bellows 44 to contract. This causes the wall 50 of the bellows 44 to shift to the right from its position shown in FIG. 1 to the position shown in FIG. 2. As the wall 50 shifts to the right, the arm 52 shifts therewith and presses against the stop member 48. The stop member 48 will pivot to the right from its position shown in FIG. 1 to its second, sealing position shown in FIG. 2 whereat the stop member 48 completely blocks or covers the second leg 24. In this position the stop 48 isolates the relief valve 12, pressure gauge 30 and pressure applying mechanism 34 from the system 14.

As the operator continues to apply pressurized air through the hose connection 38 the bellows 44 continues to contract, which causes the wall 50 and arm 52 to shift further to the right. The arm 52 engages the stop member 48 via a lost motion connection 54 that allows the arm 52 to shift to the right with respect to the stop member 48 after the stop member 48 has sealed the second leg 24. The bellows 44 continues to contract, which causes the fluid pressure within the first, third and fourth legs 22, 26 and 28 of the cross tee member 20 to increase. As the fluid pressure increases, the relief valve 12 will eventually open as the spring force applied to the ball 18 is overcome by the fluid pressure in the first leg 22. As the ball 18 shifts and the relief valve 12 opens, the operator observes the pressure reading on the pressure gauge 30 to determine the pressure at which the safety valve 12 is actuated.

The operator can then remove the air hose 40 from the hose connection 38. With the air hose 40 removed, the air hose connection 38 exposes the left side of the bellows 44 to atmospheric pressure, which is less than the fluid pressure in the cross tee member 20. The high pressure within the cross tee member 20 will therefore cause the bellows 44 to expand to its previous position shown in FIG. 1. As the bellows 44 expands, the wall 50 will shift to the left pulling the arm 52 with it. The leftward shifting arm 52 will pull or pivot the stop member 48 up until the second leg 24 becomes unsealed. Once the stop member 48 pivots to its unsealed position shown in FIG. 1, the relief valve 12 will again be in fluid communication with the fluid system 14 so that the relief valve 12 can blow off fluid from the system 14 if undesirably high pressures are achieved.

The drawings and above description depict a stop member 48 that pivots between an unsealed and a sealed position. The stop member 48 is pivoted between positions by an arm 52 that is coupled with the stop member 48 by way of a lost motion connection 54. However, the stop member 48 could also be adapted to shift linearly to seal the second leg 24 within the spirit of the present invention, and other arm linkages could be provided without departing from the spirit of the present invention.

Figure 3:
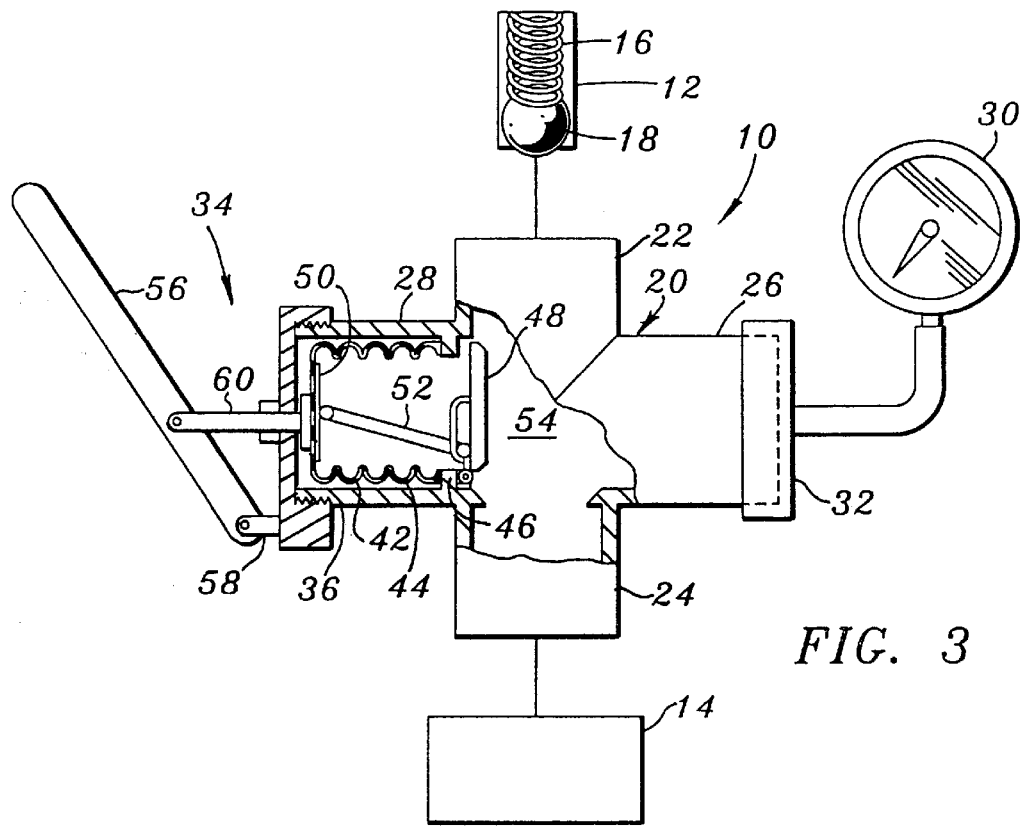
FIG. 3 is a schematic view of the an alternative embodiment of the relief valve tester having a lever engagable for applying pressure during the pressure test.

An alternative embodiment of the pressure applying mechanism is shown schematically in FIG. 3. A lever 56 is pivotally supported by a support arm 58. A plunger 60 extends between the lever 56 and the wall 50 of the bellows 44. During a test of the relief valve 12, the operator presses the lever 56, which causes the plunger 60 to compress the bellows 44. Therefore, the lever 56 applies a force to compress the bellows 44 by way of a mechanical linkage, whereas the air hose connection 38 applies a force to compress the bellows 44 by way of fluid air pressure.

Figure 4:
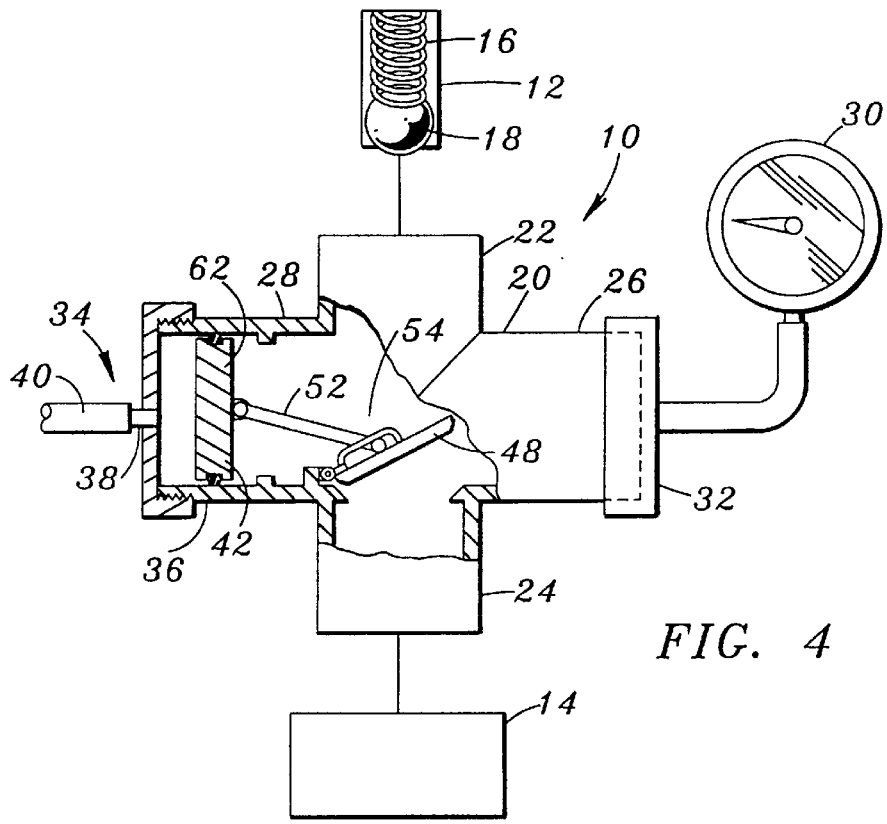
FIG. 4 is a schematic view of an alternative embodiment of the relief valve tester having a piston as a barrier member.

An alternative embodiment of the barrier member is shown schematically in FIG. 4. A piston 62 is positioned within the fourth leg 28 of the cross tee member 20, and establishes a seal against the interior diameter of the fourth leg 28. The arm member 52 is coupled with the piston 62. As pressurized air is introduced through the air hose connection 38 during a relief valve test, the piston 62 is forced to the right, which causes the arm 52 to shift, pivoting the stop member 48 to its sealing position. The rightwardly shifting piston 62 increases the pressure within the first and third legs 22 and 26 of the tee member 20, and eventually will cause the relief valve 12 to blow. The pressure gauge 30 indicates the pressure at which the relief valve 12 is actuated during the test. The piston 62 acts as a barrier between the fluid in the cross tee member 20 and the air supplied via the air hose connection 38. Therefore, the relief valve 12 is tested utilizing the fluid that will actuate the relief valve 12 during operating conditions, which will make the relief valve tests more accurate.

The present invention therefore provides a mechanism for testing the pressure at which the relief valve 12 will open. The tester has the advantage of allowing the relief valve 12 to be tested while the valve 12 remains connected with the fluid system 14. The testing operation therefore does not require the operator to remove the relief valve 12 from the system 14, which would be a time consuming operation. The stop member 48 automatically isolates the fluid system 14 from the relief valve 12 during the test so that the system components will not be damaged during the test. Isolation of the fluid system 14 from the relief valve 12 during the test eliminates the need to increase the fluid system's pressure during the test. Isolation of the system 14 from the relief valve 12 being pressurized during the test eliminates the risk of failure of the system components during the test. Isolation of the relief valve 12 from the system 14 also eliminates the need to reset the system's pressure after the test is complete. The mechanism 10 tests the relief valve 12 using the same fluid as is in the fluid system 14. Since the same fluid that will engage the relief valve 12 during normal operation of the system 14 is used to engage the relief valve 12 during the valve test, the test is relatively accurate since the test conditions are very close to those encountered during actual operation. During the test the relief valve 12 is actually actuated, and therefore inaccurate calculations based on possibly incorrect presumptions are not utilized.

What is claimed is:

1. A test mechanism for determining the pressure at which a relief valve will be actuated for relieving pressure from a fluid system, said test mechanism comprising:

a) a pressure gauge operatively positioned between the relief valve and the fluid system;

b) a pressure applying mechanism operatively positioned between the relief valve and the fluid system for applying pressure to the relief valve; and c) a stop member operatively coupled with the fluid system for isolating the pressure gauge, pressure applying mechanism and relief valve from the fluid system when the pressure applying mechanism is engaged, whereby said stop member prevents the fluid system from being pressurized by actuation of the pressure applying mechanism;

d) a barrier operatively positioned between the pressure applying mechanism, the fluid system and the relief valve, sealing the pressure applying mechanism from said fluid system and engaging the relief valve when the pressure applying mechanism is actuated;

e) said stop member is operatively coupled with said barrier for automatically sealing the fluid system when the pressure applying mechanism is actuated; and f) said barrier further comprises a bellows.

2. The invention of claim 1, wherein said pressure applying mechanism further comprises an air hose connection member.

3. The invention of claim 2, wherein said pressure applying mechanism further comprises a lever mechanism operatively engaged against the barrier for shifting the barrier and applying pressure between the fluid system and the relief valve.

4. The invention of claim 2, wherein said stop member is pivotally coupled with the fluid system for pivoting between a sealing position and a non-sealing position, and an arm member extending between the barrier and the stop member for pivoting the stop member to a sealing position as the pressure applying mechanism is actuated.

5. The invention of claim 1, wherein said relief valve remains operatively coupled with said fluid system during testing of said relief valve.

6. A test mechanism for testing the pressure at which a relief valve is actuated by excessive pressure in a fluid system having fluid carrying conduits, said mechanism comprising:

a) a stop member having a first position whereat the stop member exposes the relief valve to the fluid system and a second position whereat the stop member seals the relief valve from the fluid system;

b) a pressure gauge operatively positioned between the stop member and the relief valve for sensing the pressure of fluid within a portion of conduit between the stop member and the relief valve when the stop member is in the second position;

c) a pressure applying mechanism which, when actuated, applies pressure to the portion of conduit between the stop member and the relief valve when the stop member is in the second position;

d) a barrier operatively positioned between the pressure applying mechanism and the portion of conduit between the stop member and the relief valve, said barrier operatively prevents fluids other than fluid within the fluid system from engaging the relief valve when the pressure applying mechanism is actuated;

e) said stop member is operatively coupled with the barrier for automatically sealing the fluid system when the pressure applying mechanism is actuated;

f) said stop member is pivotally coupled with the fluid system for pivoting between a sealing position and a non-sealing position, by an arm member extending between the barrier and the stop member for pivoting the stop member to a sealing position as the pressure applying mechanism is actuated;

g) said relief valve remains operatively engaged by said fluid from said fluid system when the pressure applying mechanism is actuated during testing of said relief valve; and h) said barrier further comprises a bellows for automatically sealing the fluid system when the pressure applying mechanism is actuated.

7. The invention of claim 6, and further comprising a tee conduit having four legs, wherein the fluid system and relief valve are operatively coupled with respective opposite first and second legs, and the pressure applying mechanism and pressure gauge are operatively coupled with respective opposite third and fourth legs.

8. The invention of claim 7, wherein said barrier is operatively coupled with the same leg as the pressure supplying mechanism.

* * * * *